United States Patent [19]

Hermes

[11] 3,928,682
[45] Dec. 23, 1975

[54] METHOD FOR THE SURFACE TREATMENT OF POLYESTER MATERIALS

[75] Inventor: Julius Hermes, Martinsville, Va.

[73] Assignee: Martin Processing, Inc., Martinsville, Va.

[22] Filed: Jan. 2, 1974

[21] Appl. No.: 430,084

Related U.S. Application Data

[63] Continuation-in-part of Ser. No. 192,935, Oct. 27, 1971, abandoned.

[52] U.S. Cl. .................. 427/444; 428/480; 428/539
[51] Int. Cl.².... B05D 3/00; B32B 9/04; B32B 27/06
[58] Field of Search........ 117/138.8 F, 47 A; 156/2; 427/307, 444; 428/480, 539

[56] References Cited
UNITED STATES PATENTS

| | | | |
|---|---|---|---|
| 3,101,275 | 8/1963 | Cairns et al............................ | 117/47 |
| 3,142,582 | 7/1964 | Koretzky et al. ................. | 117/138.8 |
| 3,245,826 | 4/1966 | Luce et al.............................. | 117/47 |
| 3,400,187 | 9/1968 | Farrow..................................... | 117/7 |
| 3,551,204 | 12/1970 | Bolger et al. ............................ | 156/2 |
| 3,644,081 | 2/1972 | Matsuda et al. .................. | 117/138.8 |

*Primary Examiner*—William D. Martin
*Assistant Examiner*—Sadie L. Childs
*Attorney, Agent, or Firm*—Stevens, Davis, Miller & Mosher

[57] ABSTRACT

Polyester materials are treated in such fashion as to impart to the treated surface thereof good bondability toward other materials, such as thin films of copper foil, to provide composite laminated articles useful in the industrial arts such as for printed circuitry and the like. The treatment consists essentially in subjecting the surface of the polyester material to a solution, preferably anhydrous, of an alkali metal hydroxide in a high boiling glycol such as ethylene glycol, propylene glycol, dipropylene glycol, diethylene glycol and tetraethylene glycol.

5 Claims, 1 Drawing Figure

U.S. Patent    Dec. 23, 1975    3,928,682
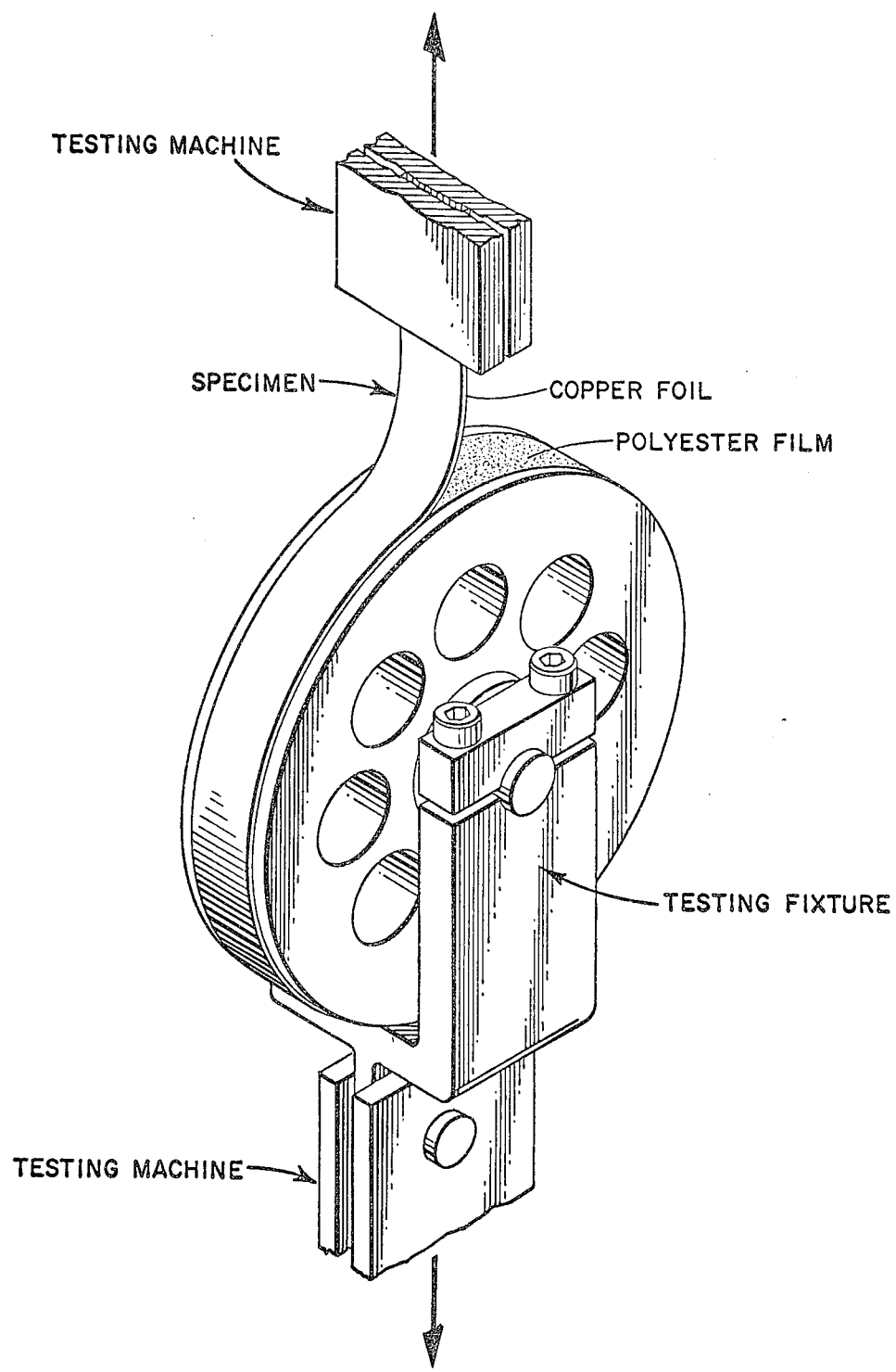

METHOD FOR THE SURFACE TREATMENT OF POLYESTER MATERIALS

This application is a continuation-in-part of my copending application Ser. No. 192,935, filed Oct. 27, 1971, now abandoned.

The present invention relates to a method for chemically treating polyester materials in such fashion as to alter the surface characteristics, and particularly with a view to rendering the polyester materials greatly improved with respect to their ability to laminate with other materials to provide composite laminated materials useful in the industrial arts.

It has for some time been an important desideratum to provide a polyester material having surface characteristics such that it can be laminated with e.g. thin copper foil in such fashion that a very strong bond will be created between the laminated layers. Thus, a thin film of polyester strongly bonded to a thin film of copper foil results in a composite laminated article highly useful in certain technical arts such as printed circuitry and the like.

Previous attempts have been made to treat the surface of polyester materials in such fashion as to alter the polyester material in the direction of imparting good bondability toward films of other materials, and these methods vary from delustering procedures to a very light etching so that the surface of the polyester material presents under the microscope the appearance of gentle hills and valleys.

I have now discovered that, surprisingly, greatly improved results are obtained by treating the surface of a polyester material with a treating solution of an alkali metal hydroxide, such as sodium hydroxide or potassium hydroxide, in a high boiling glycol such as ethylene glycol, propylene glycol, dipropylene glycol, diethylene glycol and tetraethylene glycol.

Preferably, these glycol solutions of an alkali metal hydroxide such as sodium hydroxide or potassium hydroxide are employed in substantially anhydrous form. They are of course free of added water. It is sometimes advantageous to incorporate small amounts (e.g., up to about 6%) of an additional solvent such as benzyl alcohol in the etching solution.

I have further discovered that by employing the treating solutions of the kind just mentioned under the conditions to be mentioned hereinafter, as distinguished from the treating solutions and conditions of the prior art, I can readily obtain polyester articles having surfaces that are evenly etched, free of blotches, and of a bond-strength in the resulting laminated products that is greatly improved both as regards uniformity and in absolute value.

The glycol solutions of e.g. potassium hydroxide or sodium hydroxide may be employed over a rather wide range of conditions such as temperature, time of treatment, and concentration.

For example, temperatures as low as 25°C. have been employed as well as temperatures at or near the boiling point of the respective treating solutions.

Times of treatment may be varied from as low as 5 seconds to as high as 60 seconds.

Generally speaking, for a given concentration of caustic alkali it is preferable to maintain a substantially inverse ratio between the temperature and the time of treatment; i.e., desirable results can be obtained with shorter times of treatment the higher the temperature, and this is one of the especially desirable features of this invention from the point of view of commercial feasibility.

The third factor mentioned above, viz. concentration, is also an important consideration because for a given temperature of treatment, the time of treatment will be lesser at a higher concentration of caustic alkali. For example, I have successfully employed glycol solutions or dispersions of sodium hydroxide or potassium hydroxide in which the caustic alkali content varied from 5 to 50% by weight, at temperatures varying from 50°C. to about the glass transition temperature (Tg) of the polyester material and at time varying from 2 seconds to 60 seconds or more, respectively.

While those skilled in the art will appreciate that rather wide variations in the treating conditions whose limits have been mentioned above are permissible, at the same time for any given polyester starting material some slight latitude must be accorded the skilled worker in selecting the optimum conditions within those broad limits that will give him satisfactory bonding characteristics with respect to the particular material, such as copper foil or the like, to be eventually bonded to the treated polyester substrate.

The treatment of the polyester material is preferably carried out under substantially atmospheric pressure.

The treatment may be conducted batch-wise or in a continuous manner.

After the treatment with the glycol solution of caustic alkali, the surface-treated polyester material is preferably subjected to a washing operation to remove excess treating agent. A suitable washing liquid for this purpose is water, and if desired, the wash liquid containing the excess treating solution may be subjected to conventional steps for the recovery of the glycol as well as the caustic alkali.

I do not wish to be limited to the treatment of any particular kind of polyester material, especially since polyester materials are old and well known and per se form no part of the present invention. Consequently, I deem it sufficient for disclosure purposes to refer broadly to the following literature source for further information on these per se old materials: Mark-Gaylord's Encyclopedia of Polymer Technology, Vol. 11, 1969, pages 1–128 and especially pages 42–61 on polyester films.

In order still further to illustrate the invention, the following more detailed description is given without limitation of the invention:

In testing for bond strength, a commercial product Epi-Rez 5155, which is an epoxy novolak having the same reactivity and equivalent weight as DEN438, may be used as the adhesive. In addition, other commercial adhesives such as E-469 (a phenolicbutyral resin), E-1701 (a modified epoxy resin), and C-1703 (an acylic epoxy resin), are well suited for use as the adhesive between the polyester film and other film (such as copper foil) comprising the composite laminated article.

In order to test the results of the process of the present invention, the following two quality control test methods are used. One of these was No. 1022 for testing the adherability of the polyester film, and the other was No. 1000 for determining the laminate bond strength. Both tests make use of a testing fixture including a so-called German wheel as shown in the accompanying drawing, as per the IPC (Institute of Printed Circuits) proposed specification No. 1PC-FC-250, June 1971. This fixture provides for reproducible peel angles for the separating films undergoing test.

The details of the test methods are as follows:

QUALITY CONTROL TEST METHOD — TEST No. 1022

PURPOSE: The purpose of this test is to determine the bonding ability of polyester film/E-469 adhesive covercoat.

APPARATUS:
1. Platen Press
2. Instron
3. 1 inch Precision sample cutter

MATERIALS:
1. Polyester film/E-469 covercoat to be tested.
2. 1 oz. ED treated copper.
3. Paper: 60 white woven 13 inches × 18 inches or equivalent.

PROCEDURE:
1. Cut equal sizes (6 inches × 8 inches) of covercoat material and copper.
2. Peel away the release sheet from the E-469 adhesive.
3. Place the treated side of the copper against the E-469 side of the covercoat material.
4. Put this sample between eight sheets of paper, four over and four under.
5. This "sandwich" is put into the preheated platen press. Conditions: 325°F. to 350°F. for 30 minutes at 20 tons of pressure.
6. After 30 minutes, cool and press while maintaining pressure.
7. Remove the sample and cut 1 inch specimens MD and TD for Instron testing.
8. Use the German Wheel (shown in the accompanying drawing) on the Instron (2 inch/minute crosshead speed). The polyester film should be affixed to the German wheel with the copper in the Instron jaw.

RESULTS: A 3 lbs./inch minimum bond strength is required when 5 "low side" readings are averaged for a 2 inch length of sample.

QUALITY CONTROL TEST METHOD — TEST NO. 1000

BOND STRENGTH: The purpose of this test is to determine the amount of effort required to delaminate two films.

APPARATUS:
1. Thwing-Albert JDC precision 1 inch sample cutter.
2. Scott X-5 single strand tester with 3 inches × 1 inch jaws.
3. Table mode Instron with accessories.

SPECIMENS: Samples should be cut 1 inch wide using the 1 inch precision sample cutter. Length of the samples should be approximately 8 inches to 10 inches. [Note: When bond strength is likely to exceed the limits of the Scott tester (6 lbs.), cut a ⅛ inch specimen using the Thwing-Albert ⅛ inch precision sample cutter. Use the same procedure, but multiply the results by eight in order to obtain a lbs./in. result.]

PROCEDURE:
1. The sample should be delaminated approximately 1½ inch to 2 inches by hand or with solvent when necessary.
2. When using the Scott tester, the separation rate will be 12'/minute. Put the heavier film in the top jaw, one film in the bottom jaw. Set the pointer at zero, and start the bottom jaw downward.
3. The Scott tester readings are taken at 90° and 180°.
   a. 90° — Hold sample tail parallel to the floor.
   b. 180° — Hold sample tail pointed to the floor.
4. When using the Instron, make sure that the scale is calibrated. The proper crosshead speed is selected and the proper load cell and scale are chosen. Put the heavier film in the top jaw, one film on the German wheel. Activate the cross-head drive and the chart drive. Five "low side" readings are averaged for a 2 inch length of sample.

RESULTS: Results are to be expressed and recorded in pounds per inch of width.

The invention may be further illustrated by the following examples which are not intended to be limiting as to the scope or spirit of the invention.

EXAMPLE I

Treatment of Polyester Film With a Solution of Potassium Hydroxide in Ethylene Glycol Under Various Conditions of Caustic Content of the Treatment Solution Samples of commercial polyester film were treated with a solution of potassium hydroxide in ethylene glycol. The films were treated under various conditions of time and caustic content as shown in Table I.

TABLE I

| Sample No. | Temp., °C. | Time, Sec. | Caustic Concentration, Percent | Film Thickness, Mils |
|---|---|---|---|---|
| 1. | 150 | 30 | 10 | 5 |
| 2. | 150 | 20 | 12 | 5 |
| 3. | 150 | 15 | 24 | 5 |
| 4. | 150 | 10 | 28 | 5 |
| 5. | 150 | 25 | 28 | 2 |
| 6. | 150 | 20 | 32 | 2 |
| 7. | 150 | 15 | 40 | 2 |

It will be apparent from the above results that for a given temperature of treatment, the time of treatment will be lesser at a higher caustic content of the treating solution.

EXAMPLE II

Treatment of Polyester Film With a Solution of Sodium Hydroxide in Ethylene Glycol Samples of commercial polyester film (5 mil) were treated with a solution of sodium hydroxide in ethylene glycol under various conditions of time as shown in Table II. The treated film samples were laminated with copper foil using E-469 adhesive.

TABLE II

| Sample No. | Temp., °C. | Time, Sec. | Caustic Concentration, Percent | Laminate Bond Strength, Pounds per inch |
|---|---|---|---|---|
| 1. | 150 | 10 | 10 | 7.5 |
| 2. | 150 | 20 | 10 | 7.7 |

It may be noted that, generally speaking, solutions of potassium hydroxide in ethylene glycol are preferred over solutions of sodium hydroxide, as the former greatly improved results both as regards uniformity and degree of etching.

EXAMPLE III

Treatment of Polyester Film With a Solution of Both Sodium Hydroxide and Potassium Hydroxide in Ethylene Glycol Samples of commercial polyester film (3 mil) were treated with a solution of sodium hydroxide and potassium hydroxide in ethylene glycol under various conditions of time and temperature as shown in Table III.

TABLE III

| Sample No. | Temp., °C. | Time, Sec. | Sodium Hydroxide Concentration, Percent | Potassium Hydroxide Concentration Percent |
|---|---|---|---|---|
| 1. | 132 | 30 | 30 | 30 |
| 2. | 138 | 20 | 30 | 30 |
| 3. | 150 | 15 | 30 | 30 |

EXAMPLE IV

Treatment of Polyester Film With a Solution of Potassium Hydroxide and Benzyl Alcohol in Ethylene Glycol Samples of commercial polyester film (2 mil) were treated with a solution of potassium hydroxide and benzyl alcohol in ethylene glycol under various conditions of alcohol concentration of the treating solution as shown in Table IV. The treated film samples were laminated with copper foil using E-469 adhesive.

TABLE IV

| Sample No. | Temp., °C. | Time, Sec. | Benzyl Alcohol Concentration, Percent | Laminate Bond Strength, Pounds per inch |
|---|---|---|---|---|
| 1. | 160 | 20 | 2 | 7.3 |
| 2. | 160 | 20 | 4 | 7.1 |
| 3. | 160 | 20 | 6 | 7.4 |

The copper foil used for laminating purposes in the foregoing examples was a commercial copper foil 2.8 mils in thickness. After lamination the laminates were cured at 160°C. for 30 minutes, after which the bond strength tests were made.

What is claimed is:

1. A method for surface-treating a polyester film in order to improve the adherability thereof to other materials comprising subjecting said polyester film to treatment under substantially anhydrous conditions with a solution comprising an alkali metal hydroxide in a relatively high boiling glycol selected from the class consisting of ethylene glycol, propylene glycol, diethylene glycol, dipropylene glycol and tetraethylene glycol.

2. A method as defined in claim 1, wherein said alkali metal hydroxide is sodium hydroxide or potassium hydroxide.

3. A method as defined in claim 1, wherein the treatment is carried out at temperatures ranging from about 50°C. up to about the glass transition temperature (Tg.) of the polyester material.

4. A method as defined in claim 1, wherein the treatment is carried out for a time ranging from about 2 seconds to 60 seconds or more.

5. A method as defined in claim 1, wherein the caustic alkali content of the treating solution varies from about 5% up to about 50% depending upon the time and temperature of the treatment.

* * * * *